Aug. 28, 1928.
S. H. ELIASON
1,682,326
PROJECTION APPARATUS
Filed Aug. 30, 1926  3 Sheets-Sheet 3
Fig. 3.
Fig. 4.
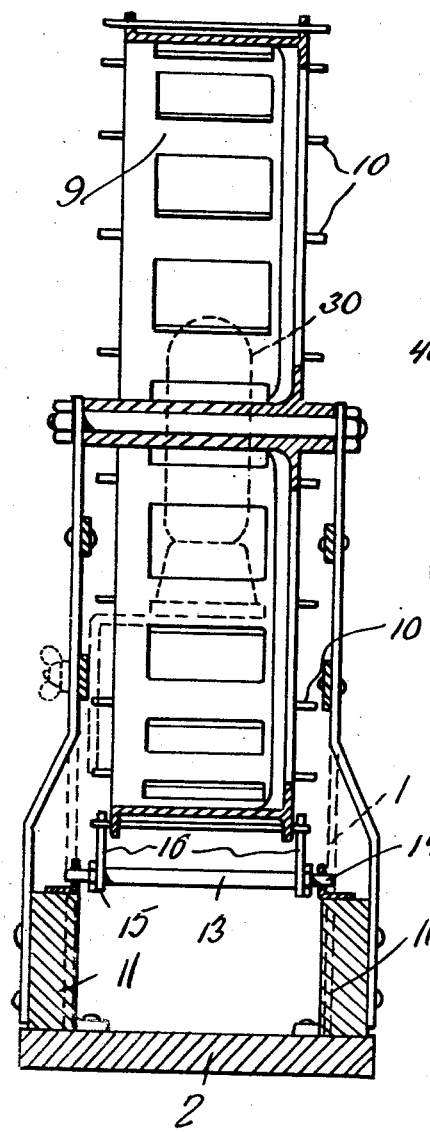
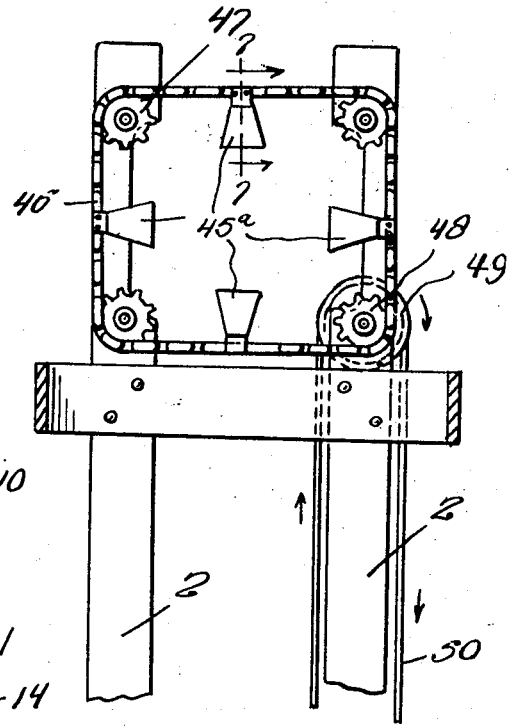
Inventor
S. H. Eliason,
By Clarence A. O'Brien
Attorney Patented Aug. 28, 1928.

1,682,326

UNITED STATES PATENT OFFICE.

SID H. ELIASON, OF PORTLAND, OREGON.

PROJECTION APPARATUS.

Application filed August 30, 1926. Serial No. 132,556.

My present invention has to do with apparatus for projecting upon a screen or other appropriate surface, pictures, symbols, or legends for advertising purposes.

The general object of my invention is the provision of an apparatus of the kind stated that is, at once, extremely simple and inexpensive in construction, reliable in operation, and adapted to be operated at a low cost.

To the attainment of the foregoing the invention consists in the improvement hereinafter described and definitely claimed.

In the accompanying drawings, forming part of this specification, and in which:—

Figure 3 is a vertical and transverse section of the apparatus taken through the center of the plate carrying wheel and showing the front part of the wheel in elevation.

Figure 4 is an enlarged transverse fragmentary section on the plane indicated by the line 4—4 of Figure 1 looking toward the right.

Figure 5 is a fragmentary enlarged elevation illustrative of the manner in which the plates are arranged upon and secured to the periphery of the wheel.

Figure 6 is an enlarged fragmentary section taken on the plane indicated by the line 6—6 of Figure 5, and showing the manner of securing the plate on the wheel, and this detachably.

Figure 7 is an enlarged fragmentary section taken on the plane indicated by the line 7—7 of Figure 4, looking downwardly, and showing a portion of the endless chain in proper relation to one of the imperforate flicker members of the apparatus.

Similar numerals of reference designate corresponding parts in all of the views of the drawings.

Figure 1:
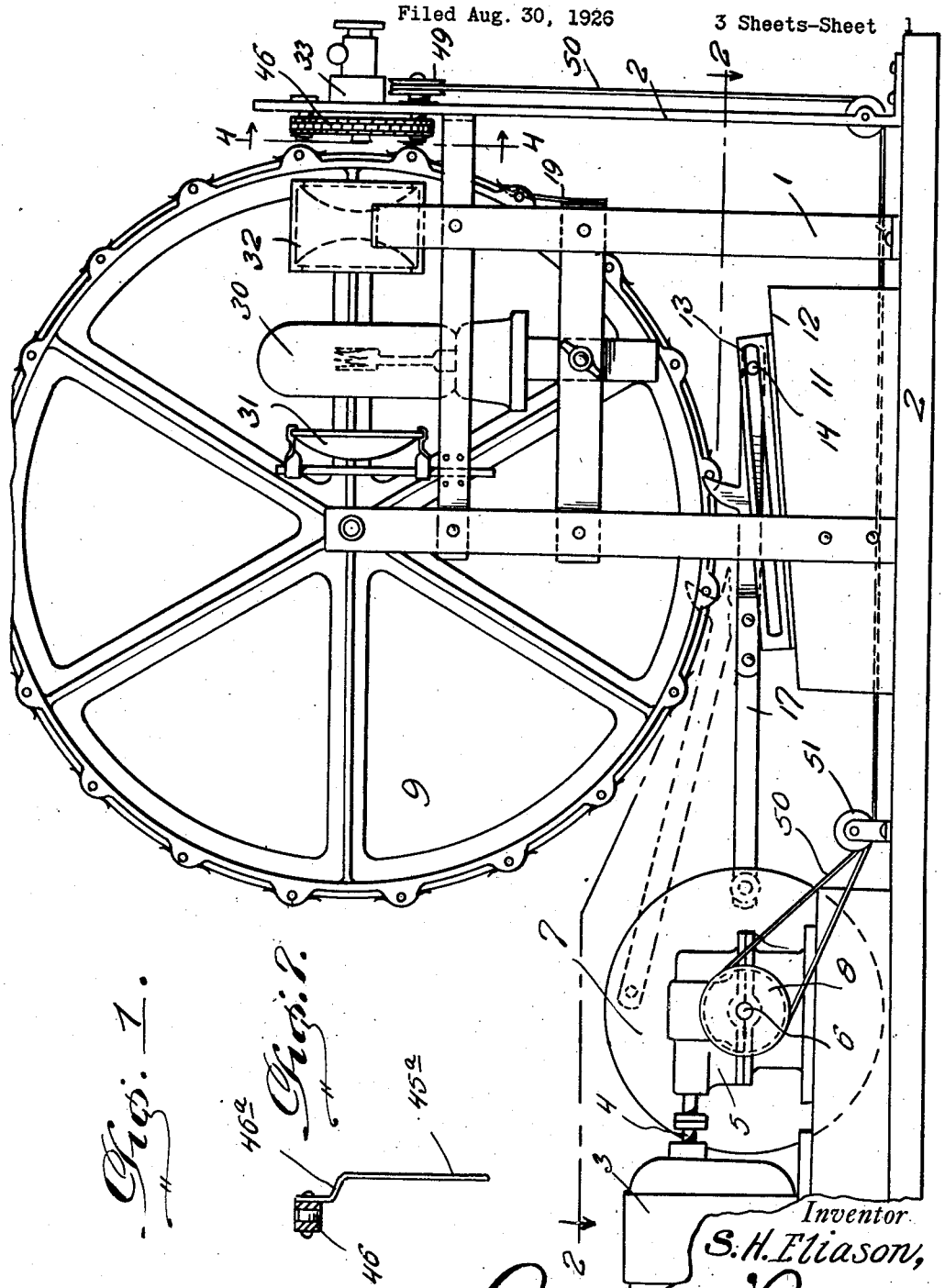
Figure 1 is a side elevation of the apparatus constituting the preferred embodiment of my invention.

Among other elements, the apparatus comprises a main frame 1 which may be of the construction illustrated or of any other construction consonant with the purposes of my invention. Included in the said frame 1 is a base 2 and superposed upon the base is an electric motor 3, the armature shaft 4 of which is connected with reducing gearing of conventional or any other improved type arranged in a housing 5, the said reducing gearing being connected, in turn, with a shaft 6 which carries a crank disc 7 and also carries a circumferentially grooved wheel 8, Figures 1 and 2.

Mounted to rotate between standards comprised in the main frame 1 is a wheel 9 of hollow type, the said wheel 9 being provided adjacent to its periphery with lateral pins 10 spaced apart and arranged in circular sets.

Superposed upon and fixed to the base 2 is a block 11 with an inclined upper surface 12, and fixed on the said surface 12 of block 11 are longitudinal guides 13. Disposed and movable in the guides 13 are lateral pins 14 on a bail-shaped detent 15, the said detent 15 having upon its opposite sides upstanding teeth 16 adapted to engage the pins 10 after the manner shown in Figure 1 and turn the wheel 9 anti-clockwise through a portion of revolution incident to each traverse of the detent 15 toward the right in Figures 1 and 2. As will be readily understood from Figures 1 and 2, the detent 15 is connected to a bar 17, and the said bar 17 is connected, in turn, to the crank disc 7, and hence it will be readily understood that rotation of the crank disc 7 will be attended by reciprocation of the detent 15. It will also be understood from the arrangement described that on the rearward idle stroke of the detent 15 the teeth 16 will clear the pins 10 adjacent to and immediately in rear of the teeth 16.

It will be apparent from the foregoing that when my novel apparatus is in operation, the wheel 9 will be turned about its axis step by step and that there will be a dwell between each movement of the wheel 9, this for the retention for a particular period of time of one of the plates carried by the wheel 9 in alignment or registration with the projecting means hereinafter described.

It will be understood by comparison of Figures 1, 3, 5 and 6, that the wheel 9 is provided with cross rods 18 adjacent to the periphery of the wheel and that the end portions of the said rods 18 are preferably employed to form the before mentioned lateral pins 10.

Figure 2:
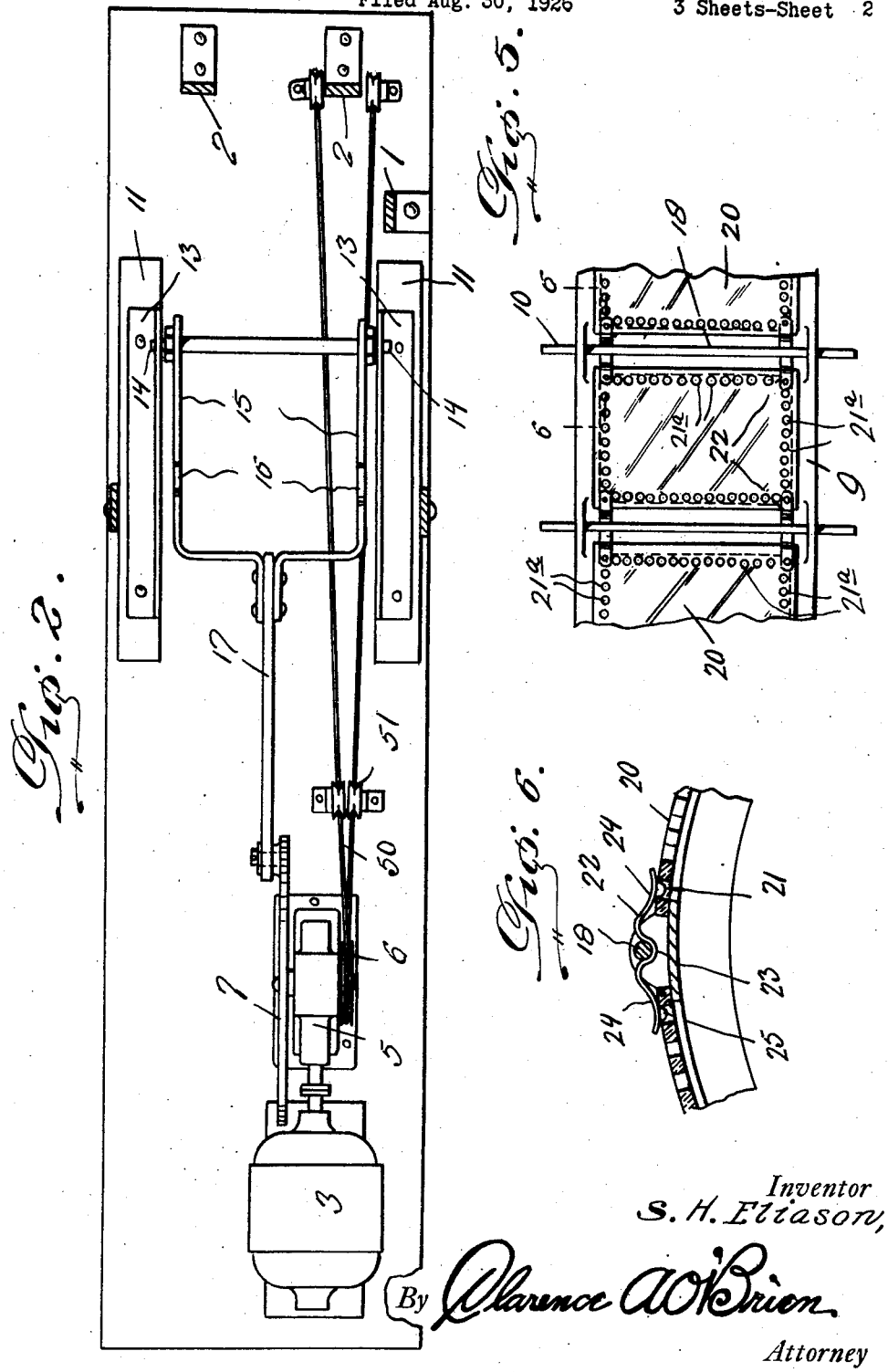
Figure 2 is a horizontal section of the apparatus taken on the line 2—2 of Figure 1, looking downwardly.

A spring keeper, best shown in Figure 1 and numbered 19, serves by engaging the cross rods 18 in succession to hold the wheel 9 against casual movement, and it will be understood in this connection that in the anti-clockwise movement of the wheel 9 the stress exerted upon the wheel 9 is all that is necessary to move the cross rods 18 into and out of engagement with the spring finger 19.

The cross rods 18 also serve in the detachable securing of plates 20 on the peripheral portion of the wheel 9, the said plates 20 being designed to carry advertising matter or other matter to be projected. The use of the rods 18 for the purpose stated will be fully understood when it is stated that the plates 20 are each provided adjacent to their corners with apertures 21, and that spring keepers 22 are associated with the rods 18 and the apertured plates 20 for the retention of the plates 20 in working position, and this in such manner that any one of the plates 20 may be expeditiously and easily removed and yet there is no liability incident to the use of the apparatus of any one of the plates 20 being casually displaced.

As will be readily understood by comparison of the figures of the drawings, particularly Figures 5 and 6, each of the spring fasteners 22 is in the form of a curvilinear strip of appropriate spring metal, and is provided with a central seat 23 to receive one rod 18 and is also provided with end portions 24 on which are projections 25 designed to take into plate apertures 21. Manifestly when arranged as illustrated, the fasteners 22 may be depended upon to securely hold the plates 20, and yet when it is desired to remove any one of the plates 20 the same may be accomplished after a little stress is applied to the ends of fastener members 22 and the said ends are moved outwardly so as to disengage the projections 25 from the plates to be removed.

It also follows from the foregoing that plates 20 may be placed and secured on the wheel 9 quite as quickly and easily as the plates 20 are released and removed in the manner described.

As shown in Figure 1 my novel apparatus also comprises a lamp 30, preferably of incandescent electric type, an intensifying lens 31 back of the said lamp 30, condensing lenses 32 in front of the lamp 30 and a projecting lens 33 disposed in front of the condensing lenses and also in front of and in spaced relation to the periphery of the wheel 9.

In the space back of the projecting lens 33 and between the same and the peripheral portion of the wheel 9 is arranged the flicker mechainsm of my improvement, the said flicker mechanism being of course, continously moved while the apparatus is in action. The said flicker mechanism comprises a plurality of spaced imperforate blades 45$^a$, and a belt 46, preferably of sprocket chain type, by which said blades are carried and moved, the said belt 46 being mounted upon a plurality of sprocket gears 47 and 48, the sprocket gear 48 being fixed to and movable with a sheave 49 which is driven from the before mentioned sheave or pulley 8 through the medium of a belt 50 that is passed under guide pulleys or sheaves 51, Figures 1 and 2. The blades 45$^a$ are offset as indicated by 46$^a$ so as to clear the sprocket gears 47 and 48.

As shown in Figure 5 each of the plates 20, the central portion of which is transparent as represented is provided adjacent to its edges with lines of small apertures 21$^a$ designed in cooperation with the blades 45$^a$ to produce a flickering effect around the border of the plate to the subject of which is being projected, this with a view to producing an animated border similar to the "chasing" lights of other animated advertising or projecting apparatus. Manifestly my novel means for producing said effect is extremely simple, inexpensive and durable, and in this connection I would have it understood that there is sufficient contrast between the apertured and adjacent transparent parts of the plates 20 to assure the production of the said flicking effect.

It will be appreciated from the foregoing that my novel projecting apparatus as a whole is simple and inexpensive in construction, easy to operate, is reliable in operation, and is free of complicated and delicate parts such as are likely to get out of order after a short period of use.

I have entered into a detailed description of the construction and relative arrangement of the parts embraced in the present and preferred embodiment of my invention in order to impart a full, clear, and exact understanding of said embodiment. I do not desire, however, to be understood as limiting myself to the precise structure disclosed, my invention being defined by my appended claims within the scope of which structural changes or modifications may be made without departing from my invention.

Having thus described the invention, what I claim as new and desire to secure by Letters Patent is:—

1. In a projecting apparatus and in combination, light projecting means, said means comprising a projecting lens, movable blades spaced apart back of said lens, a wheel having its peripheral portion disposed back of said movable blades and in projecting position behind the lens, means for detachably securing plates bearing subjects to be projected, on the peripheral portion of the wheel, said plates characterized by apertures adjacent to their edges forming a border, means for turning the wheel at intervals through parts of a revolution, yielding means for preventing casual turning of the wheel, and means for moving said blades.

2. In combination, a frame, inclined guides thereon, a reciprocatory detent having portions in parallelism movable in said guides and also having lateral fingers, a rotary crank disc connected with and adapted to transmit motion to said detent, and a wheel mounted in the frame and having at intervals on its peripheral portion and at its sides, lateral pins adapted to be engaged by the detent fingers whereby on the working stroke of the detent the wheel will be turned through a part of a revolution.

3. In combination, a frame, a wheel mounted in the frame and having spaced projections on its peripheral portion, longitudinally inclined guide means carried by the frame, a detent movable in said guide means and having laterally projecting means arranged to cooperate with said projections of the wheel for the turning of the wheel step by step, and a rotary crank disc connected with and adapted to reciprocate the detent.

4. In combination, a projecting apparatus wheel having spaced cross bars in its peripheral portion, plates adapted to be carried by the peripheral portion of the wheel and having apertures adjacent to their corners, and spring fasteners having central depressions adapted to receive the cross rods of the wheel and also having end portions equipped with projections adapted to be sprung into and out of the apertures of the plates.

5. In a projecting apparatus, and in combination, a frame, a projecting lens, a belt, blades carried by said belt and spaced apart and arranged and movable back of the projecting lens, a wheel having a peripheral portion movable back of the said blades and adapted to carry plates bearing subject matter to be projected, said wheel equipped with means for cooperation with a detent, a reciprocatory detent for acting against said means of the wheel, a crank disc connected with and adapted to actuate said detent, a pulley movable with said crank disc, and means connecting said pulley and said blade-carrying belt for the movement of the latter by the former.

6. In a projecting apparatus, and in combination, a projecting lens, an element carrying a subject to be projected, said element having spaced apertures in a series about the subject bearing portion thereof, light means, means carrying said element, and light obscuring means movable between the projecting lens and said element and adapted to momentarily cut off the light from the lens and by cooperation with the apertures of said element produce a flickering or light-chasing border about the subject projected.

7. In a projecting apparatus, and in combination, a projecting lens, an element carrying a subject to be projected, said element having spaced apertures in a series about the subject bearing portion thereof, light means, movable means carrying said element, and light obscuring means movable between the projecting lens and said element and adapted to momentarily cut off the light from the lens and by cooperation with the apertures of said element produce a flickering or light chasing border about the subject projected; the means carrying said element and the means for obscuring the light being operable by a common driver.

8. In a projecting apparatus, and in combination, a projecting lens, an element carrying a subject to be projected, said element having spaced apertures in a series about the subject bearing portion thereof, light means, movable means carrying said element, and light obscuring means movable between the projecting lens and said element and adapted to momentarily cut off the light from the lens and by cooperation with the apertures of said element produce a flickering or light-chasing border about the subject projected; the said light obscuring means made up of a belt, and blades spaced apart on said belt and movable in succession back of and through positions in coincidence with the projecting means.

9. In a projecting apparatus, and in combination, a projecting lens, a diaphanous element carrying a subject to be projected, said element having spaced apertures therethrough in a series about the subject bearing portion thereof, light means, and light obscuring means movable between the projecting lens and said element and adapted to momentarily cut off the light from the lens and by cooperation with the apertures of said elements produce a flickering border about the subject projected.

In testimony whereof I affix my signature.

SID H. ELIASON.